J. F. COLLINS AND L. B. WESTON.
LAST.
APPLICATION FILED DEC. 1, 1916.
1,346,297.
Patented July 13, 1920.
8 SHEETS—SHEET 1.
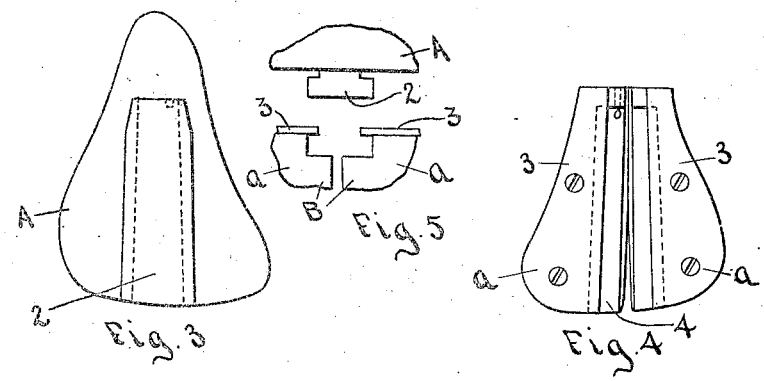
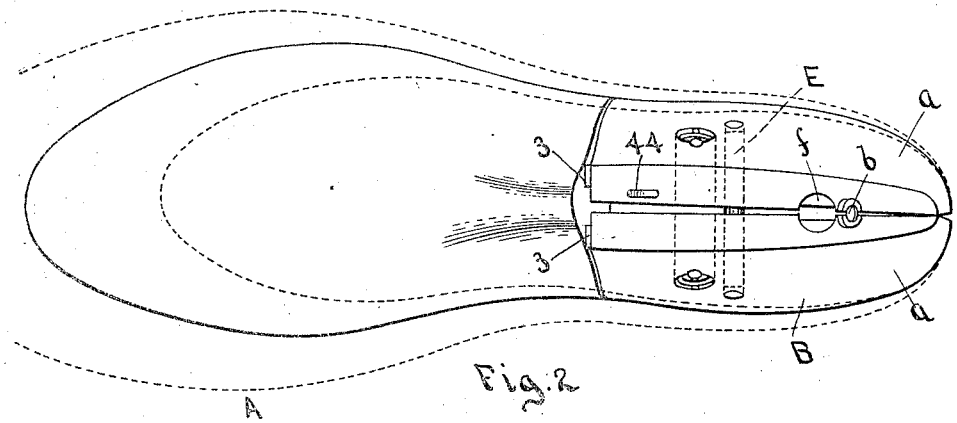
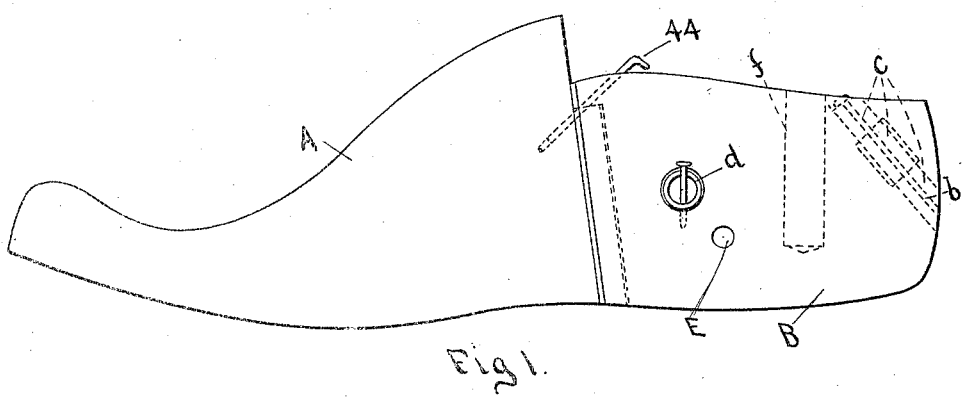
Inventors
J. F. Collins and L. B. Weston
by E. D. Chadwick,
Att'y

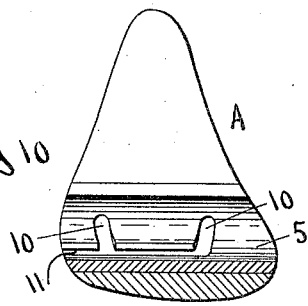
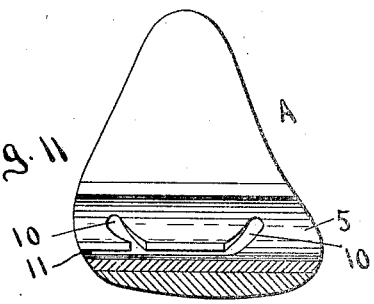
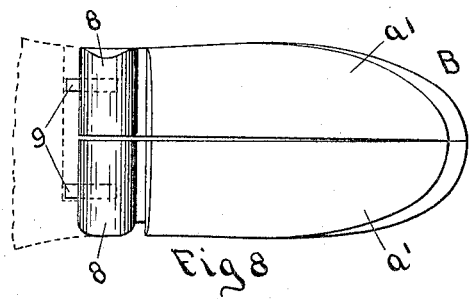
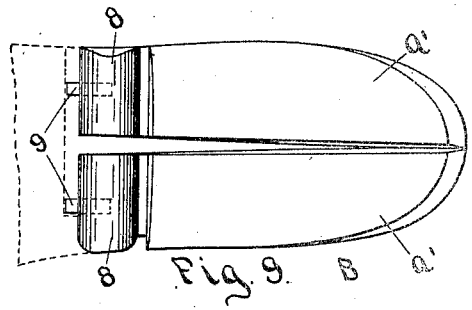
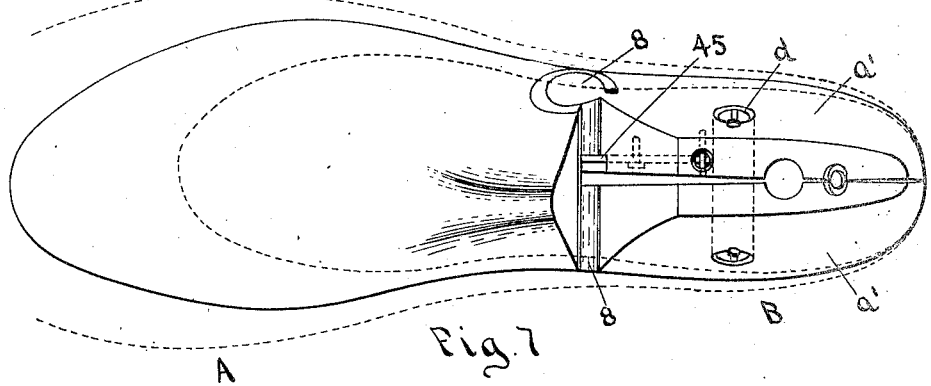
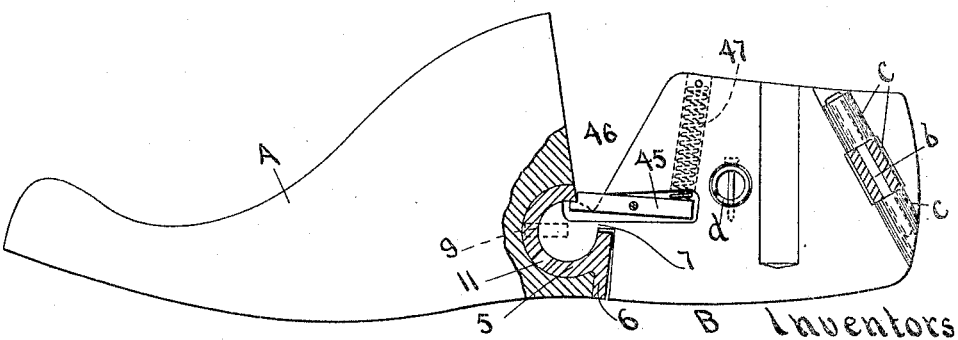

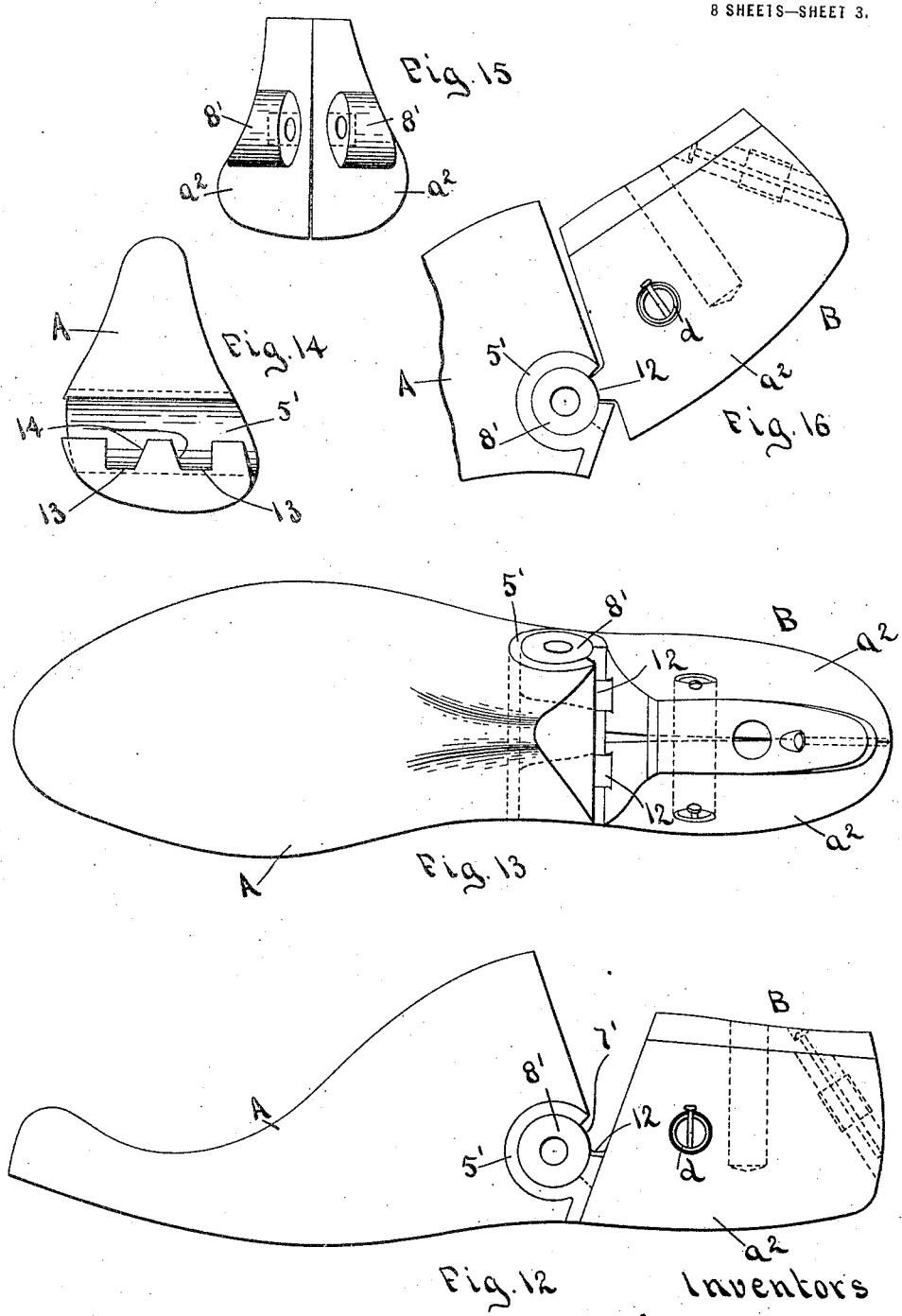

J. F. COLLINS AND L. B. WESTON.
LAST.
APPLICATION FILED DEC. 1, 1916.
1,346,297.
Patented July 13, 1920.
8 SHEETS—SHEET 4.
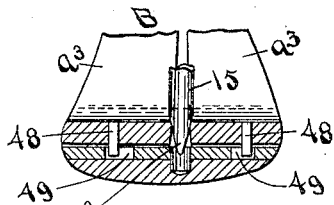
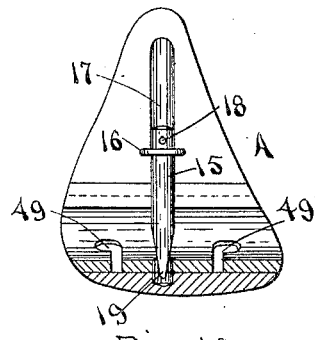
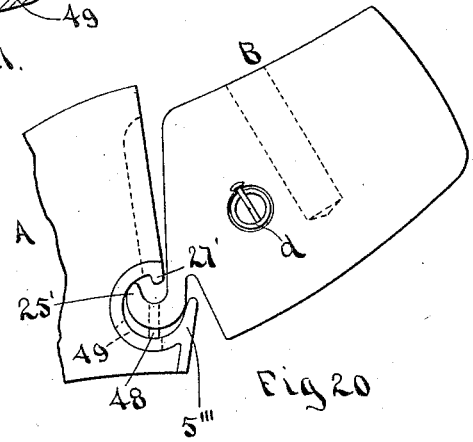
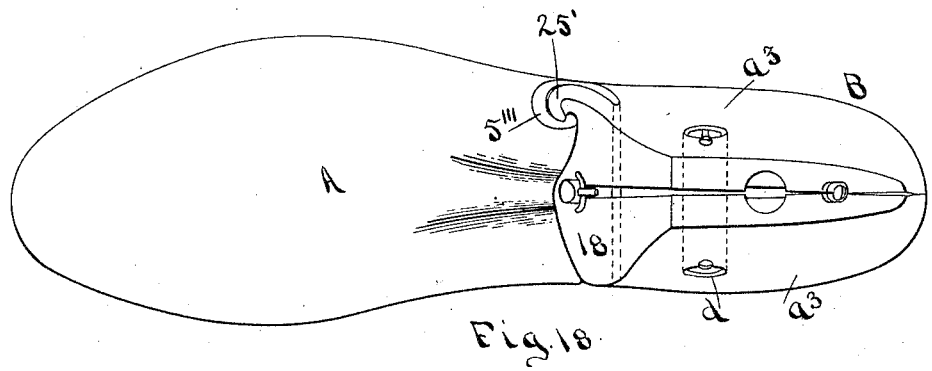
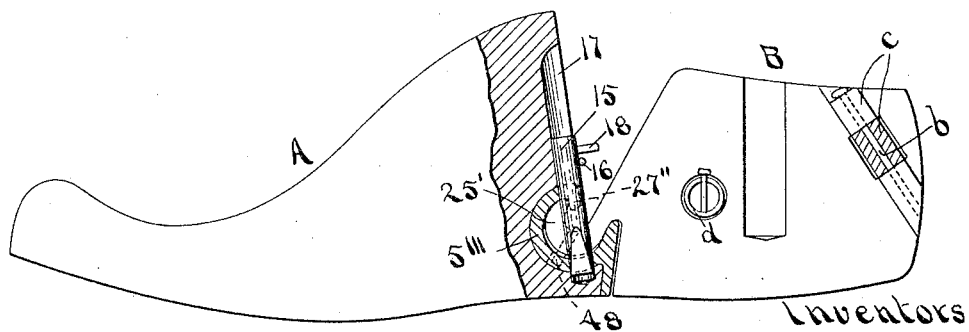

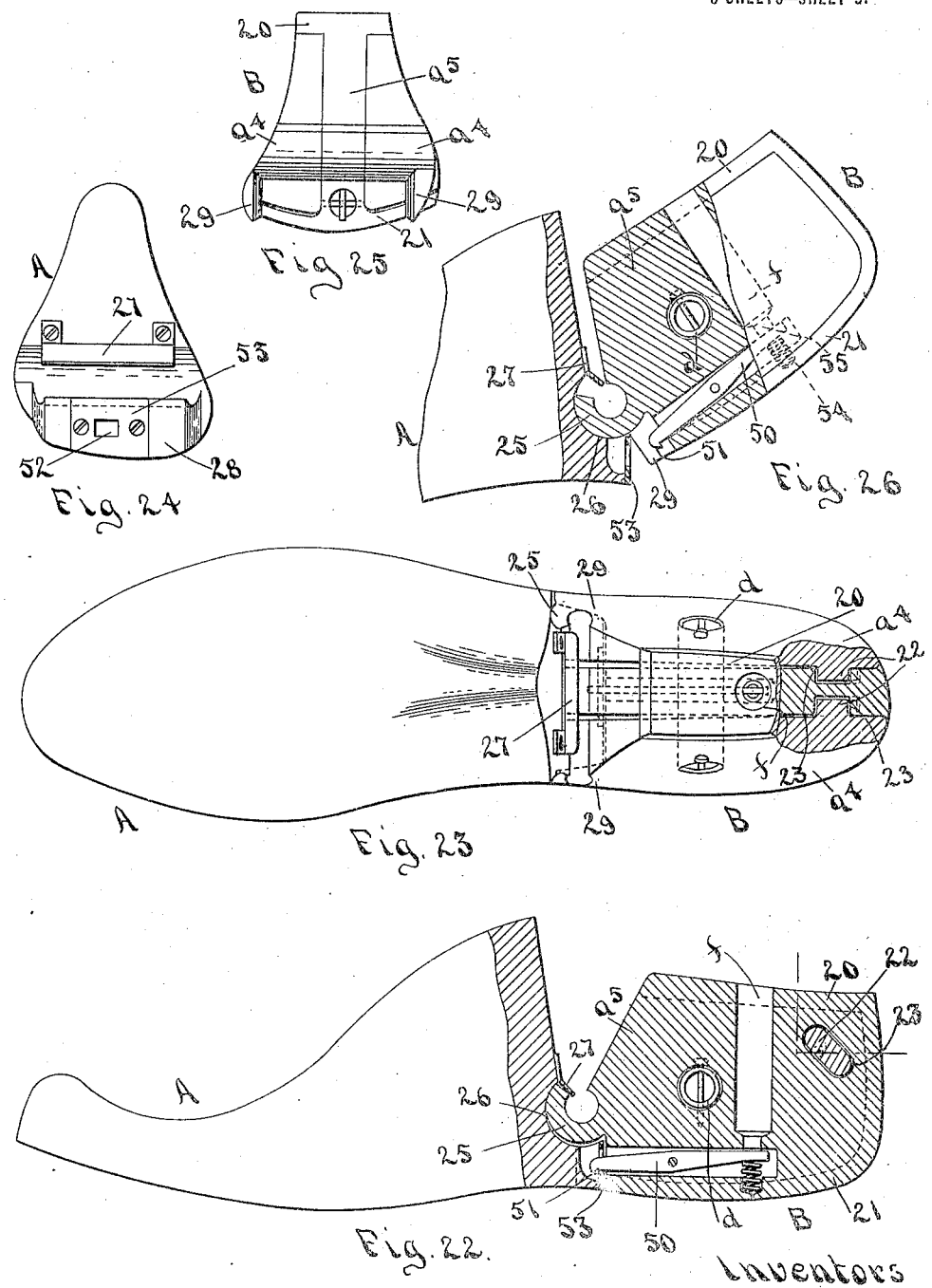

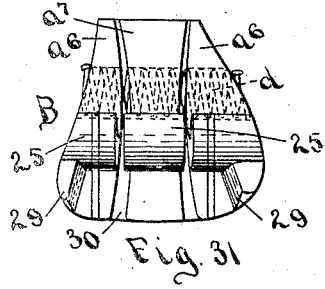
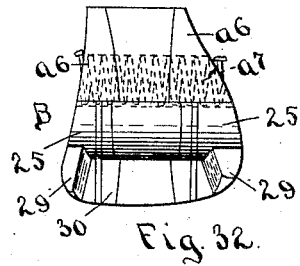
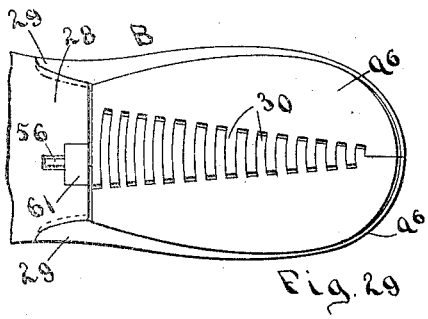
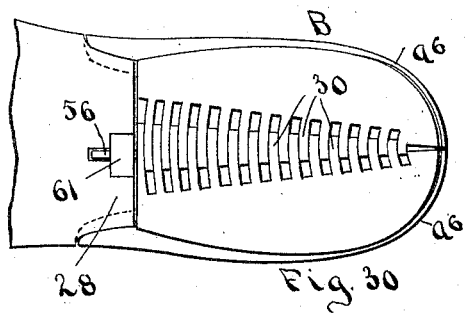
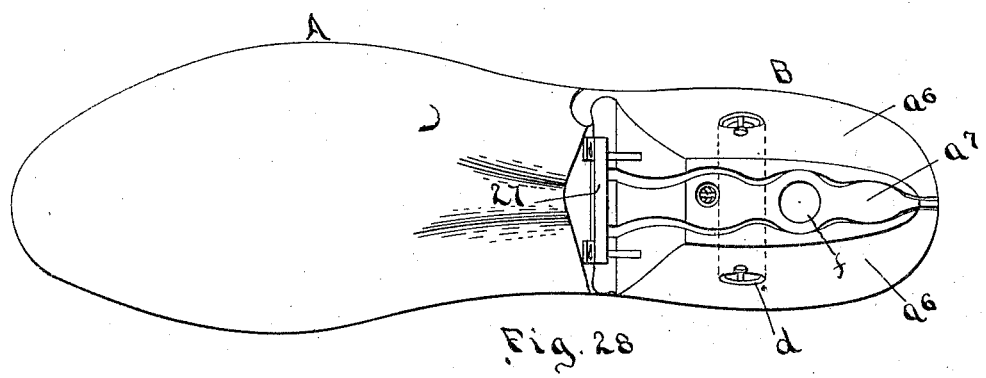
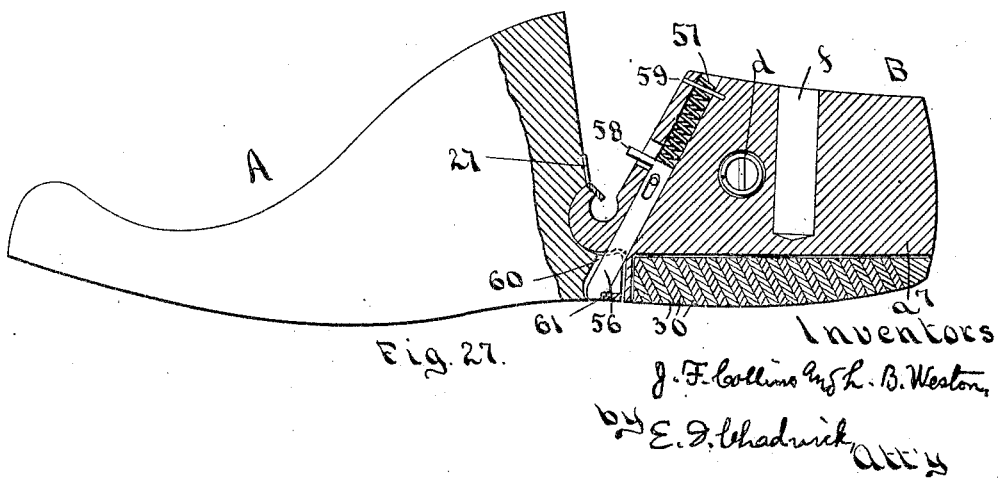

J. F. COLLINS AND L. B. WESTON.
LAST.
APPLICATION FILED DEC. 1, 1916.
1,346,297.
Patented July 13, 1920.
8 SHEETS—SHEET 7.
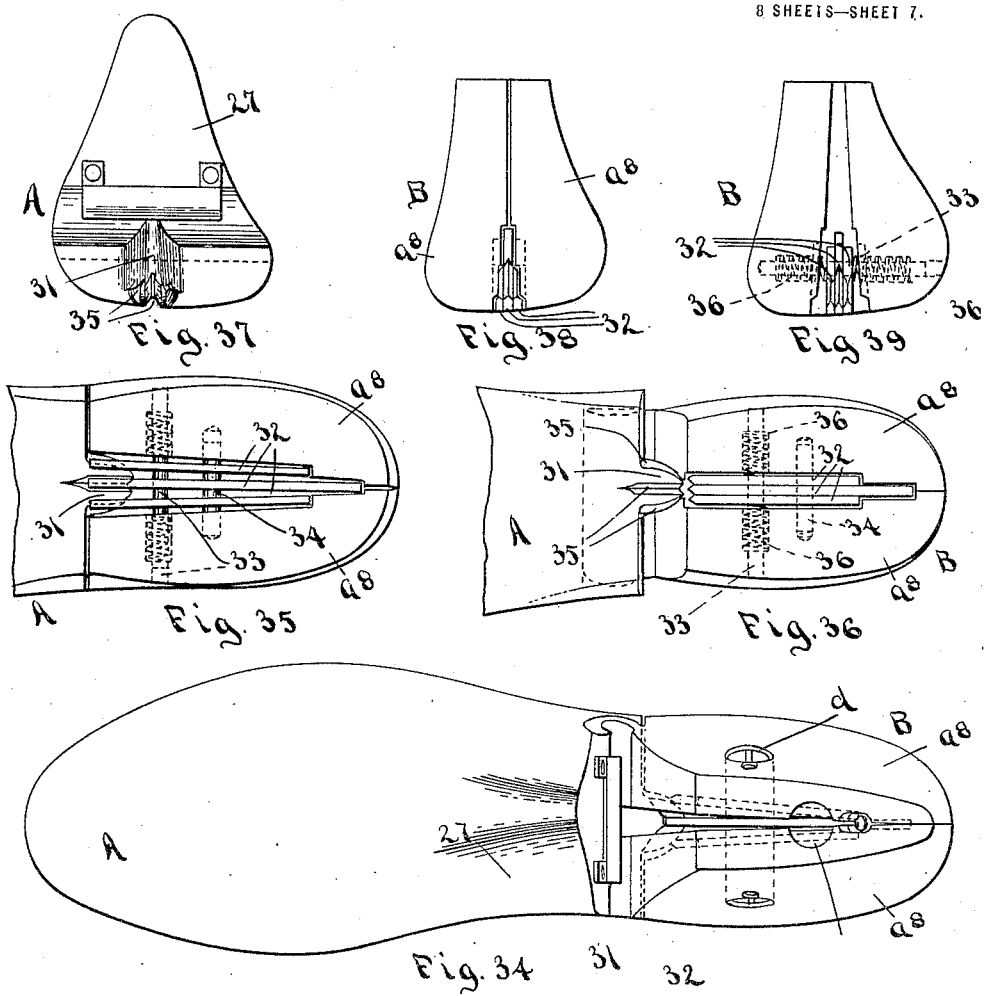
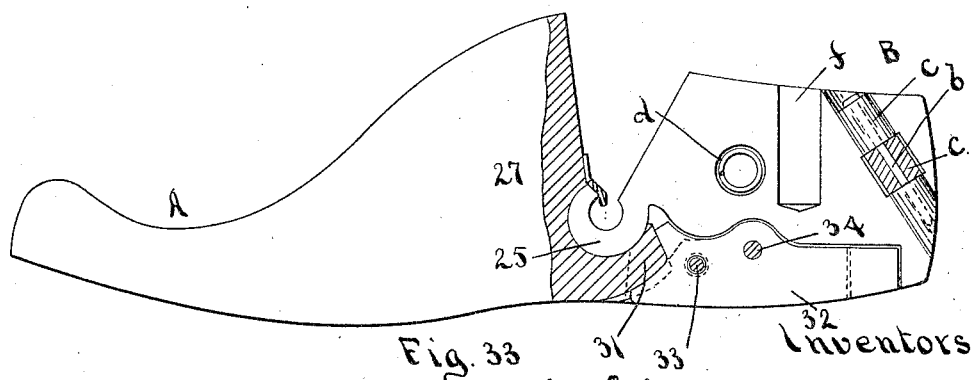

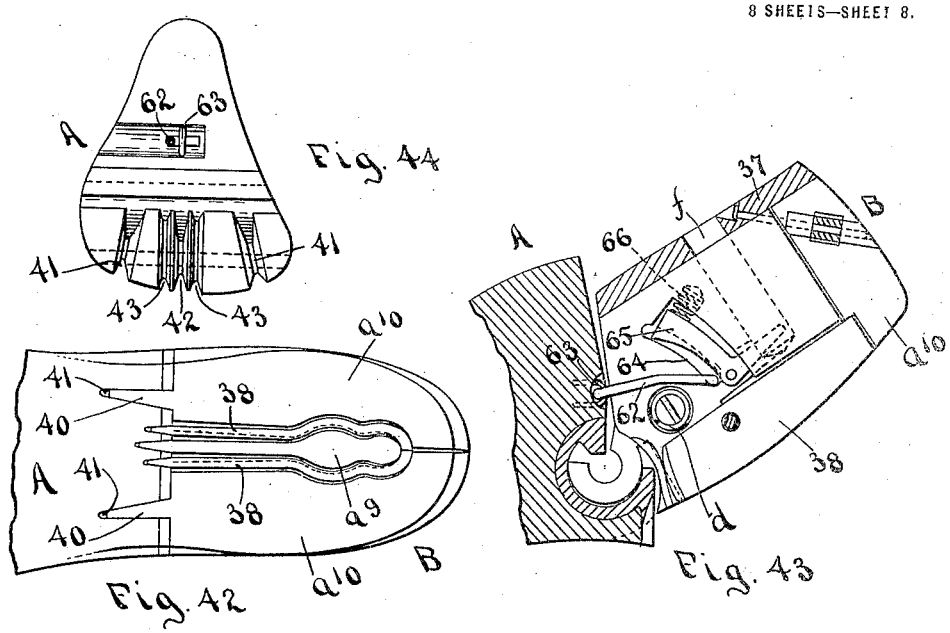
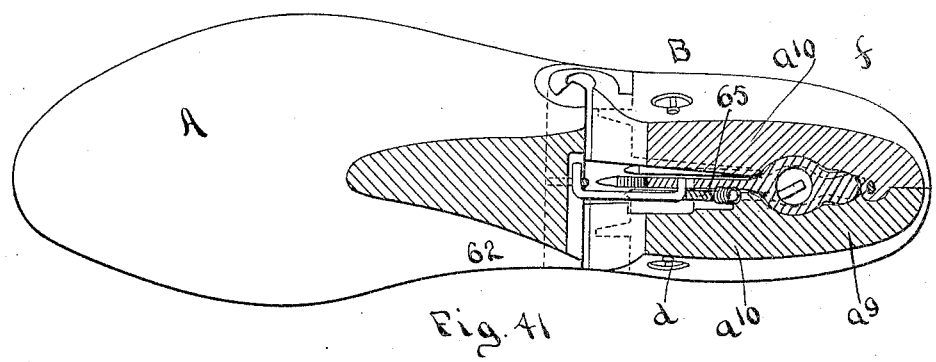
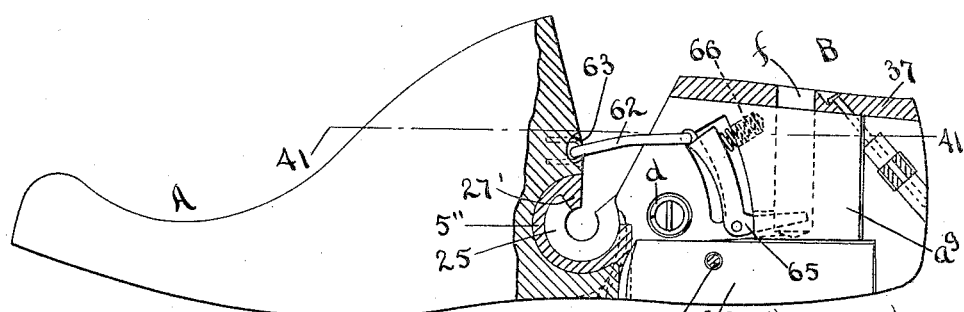

UNITED STATES PATENT OFFICE.

JEREMIAH F. COLLINS AND LOUIS B. WESTON, OF BROCKTON, MASSACHUSETTS.

LAST.

1,346,297.  Specification of Letters Patent.  Patented July 13, 1920.

Application filed December 1, 1916. Serial No. 134,300.

*To all whom it may concern:*

Be it known that we, JEREMIAH F. COLLINS and LOUIS B. WESTON, citizens of the United States, both residing at Brockton, in the county of Plymouth and State of Massachusetts, have invented certain new and useful Improvements in Lasts, of which the following is a specification.

The object of our invention is to effect a substantial saving in the expense heretofore involved in providing and maintaining the equipments of lasts which are required in the manufacture of shoes, and which in a given factory must include as many lasts for each size, width and style of shoe manufactured as will take care of the daily output, having regard to the length of time during which each last must remain in each shoe made on it. To this end we have devised a last characterized by the employment of a fore part and a heel part which are readily detachable one from the other and of which the heel part is laterally expansible and contractible, the expression "readily detachable" being used herein to denote the capacity for manual separation of the two parts by a simple operation which can be quickly and easily performed, as distinguished from the mere possibility of taking to pieces a last of which the component elements are intended to remain permanently connected. As a result of this construction a single heel part can be interchangeably used with an indefinite number of fore parts of different sizes, widths and shapes, since its capacity for lateral expansion and contraction enables it to be varied in width to correspond with the widths of the different fore parts to which it may be connected. The heel part is preferably standardized in the sense that its length and height are invariable, and variations in the length and style of the last as a whole are then taken care of by giving appropriate dimensions to the various fore parts employed. Thus our invention makes it possible to equip a factory with lasts by providing an equipment of fore parts corresponding to each of the different sizes and shapes employed in shoes of the same general classification, (men's, women's or children's,) together with a single set of heel parts, thereby saving the expense involved in the provision of as many heel parts as there are fore parts in the equipment. For example, in the case of a factory which has to keep on hand one thousand pairs of lasts for each style of shoe manufactured therein, in order to take care of its output, our invention makes it possible to equip the factory with lasts by providing one thousand pairs of fore parts of each of the different styles, together with one thousand pairs of heel parts, any pair of which may be applied to any pair of fore parts of any of the different styles, whatever their length and width may be, as occasion may require.

Our invention is capable of embodiment in a wide variety of specific constructions having the general characteristics above referred to, some of which are illustrated by way of example in the accompanying drawings, in which—

Figure 1 is a side elevation of one form of last embodying the invention;

Fig. 2 is a top plan view of the same, showing also in dotted lines the capacity of the heel part to have its width adjusted to correspond with fore parts of different sizes;

Fig. 3 is a rear elevation of the fore part;

Fig. 4 is a front elevation of the heel part;

Fig. 5 is a detail view showing the means for connecting the fore part and the heel part and expanding the latter;

Fig. 6 is a side elevation, partly in section, showing another form of our last;

Fig. 7 is a plan view of the same;

Figs. 8 and 9 are plan views showing the heel part thereof in different positions of adjustment;

Figs. 10 and 11 are transverse sectional views of fore parts of sizes corresponding to the positions of adjustment illustrated in Figs. 8 and 9 respectively;

Fig. 12 is a side elevation of another form of our last, which is generally similar to that shown in Figs. 6 and 7 but in which a somewhat different heel-expanding arrangement is employed;

Fig. 13 is a plan view of the last illustrated in Fig. 12;

Fig. 14 is a rear elevation of the fore part illustrated in Figs. 12 and 13;

Fig. 15 is a front elevation of the corresponding heel part;

Fig. 16 is a side elevation similar to Fig. 12, but showing the parts in a different position;

Fig. 17 is a side elevation, partly in vertical section, of a form of our last in which another heel-expanding arrangement is employed;

Fig. 18 is a plan view of the same;

Fig. 19 is a rear elevation, partly in section, showing the fore part of this last;

Fig. 20 is a partial side elevation illustrating a hinge connection hereinafter described;

Fig. 21 is a detail view illustrating in transverse section the hinge member and associated parts shown in Fig. 20;

Fig. 22 is a side elevation, partly in vertical section, showing a form of our last in which the heel part is composed of multiple sections;

Fig. 23 is a plan view of the last shown in Fig. 22;

Fig. 24 is a rear elevation of the fore part of the same;

Fig. 25 is a front elevation of the corresponding heel part;

Fig. 26 is a view similar to Fig. 22 but illustrating the parts in a different position;

Fig. 27 is a side elevation, partly in vertical section, showing another form of our last in which the heel part is composed of multiple sections;

Fig. 28 is a plan view of the last shown in Fig. 27;

Fig. 29 is a bottom plan view showing the heel part of a last of this construction;

Fig. 30 is a view similar to Fig. 29 but showing the parts in a different position;

Figs. 31 and 32 are front elevations of the heel part, with its sections in the positions illustrated in Figs. 30 and 29 respectively;

Fig. 33 is a side elevation, partly in section, showing another modification;

Fig. 34 is a plan view of the same;

Fig. 35 is a bottom plan view showing the heel part in expanded position;

Fig. 36 is a similar view showing the heel part in contracted position;

Fig. 37 is a rear elevation of the fore part illustrated in Figs. 33 and 34;

Fig. 38 is a front elevation of the heel part in its contracted position;

Fig. 39 is a similar view showing the heel part in expanded position;

Fig. 40 is a side elevation, partly in section, showing another form of our last which is similar in its general features to that illustrated in Figs. 33 and 34;

Fig. 41 is a sectional plan view of the last shown in Fig. 40, in which the plane of section is indicated by the line 41—41;

Fig. 42 is a bottom plan view showing the heel part in its contracted position;

Fig. 43 is an elevation similar to Fig. 40 but showing the parts in a different position; and Fig. 44 is a rear elevation of the fore part shown in Figs. 40 and 41.

In the various forms of our last which are illustrated in the drawings the fore parts and the heel parts are in each case indicated generically by the letters A and B respectively, and in each case the construction is such that the last as a whole is capable of contraction and expansion in a longitudinal direction in order to facilitate the removal of the lasts from the shoes made thereon.

In the form shown in Figs. 1 to 5 inclusive, the capacity for longitudinal contraction is provided for by slanting the adjacent ends of the fore and heel parts upward and forward from the bottom of the last and connecting them in such manner that the heel part can slide on the fore part. The fore part is of one-piece construction and may be of any desired shape and size. The heel part is divided longitudinally from top to bottom into two sections $a$—$a$ which are hinged together near the rear end of the heel, preferably on an axis extending diagonally downward and backward adjacent to the rear upper corner of the heel. Any suitable form of hinge may be employed, such as a pintle $b$ passing through overlapping hinge members $c$—$c$ formed on or carried by the section $a$—$a$. These sections are thus rendered capable of moving laterally toward and away from each other at their front ends and bottom faces, their opposed faces behind the hinge being slightly cut away, and they are drawn together by a coil spring $d$ extending transversely therein and secured at its ends to the respective sections. A transversely-extending pin $e$ located in alined recesses formed in the sections $a$—$a$ may be employed to guide them during their lateral movements and strengthen the heel part against distortion under pressure exerted otherwise than laterally. $f$ indicates the usual hole for the jack spindle, shown as formed in the sections $a$—$a$ collectively.

The means employed for detachably connecting the fore part and the heel part are shown as consisting of a block 2 carried by the rear end of the fore part and extending upward and downward thereon, the side edges of which block are undercut to provide grooves adapted to receive the edges of a pair of plates 3—3 attached to the front ends of the sections $a$—$a$ respectively. Behind the edges of the plates 3—3 said sections are provided with a recess 4 adapted to receive the block 2 and extending through the bottom of the heel part, so that the latter can be applied by sliding it downward on the slanting rear end of the fore part. The parts when thus assembled are held together by the interlocking edges of the plates 3—3 and the block 2, which are preferably tapered upwardly to a slight extent, as shown.

When the heel part is applied to the fore part as above described, it will evidently be expanded laterally to an extent depending upon the width and taper of the block 2 on the particular fore part employed, and hence by providing each fore part with a block of a width and taper appropriate to the size of that fore part the heel part can be caused to expand to the same width as the fore part to which it is attached, whatever the width of that fore part may be. The rear end of each fore part is given an external outline corresponding to that of the front end of the heel part up to the top of the latter, so that when the heel part is applied to any fore part the external surface of the last is smooth and practically continuous throughout and a complete last of the desired size, width and shape is provided. Fig. 2 shows in dotted lines the outlines of fore parts which are respectively larger and smaller than that illustrated in full lines, together with the corresponding positions assumed by the heel part when applied thereto.

It will be seen that the connection of the sections $a$—$a$ by means of a hinge located near the top of the heel part enables the latter to expand throughout the length of its lower portion, and that the diagonal arrangement of the hinge causes such expansion to be somewhat greater at the front end of the heel part than at its rear end. This is an important feature of our invention, because it has the effect of causing the bottom portion of the heel part, when expanded to any given width, to correspond substantially in outline with the appropriate sole pattern for that width throughout the periphery of the heel.

The form of last shown in Figs. 6 to 11 inclusive, is of the hinged-last type, the fore part and heel part being detachably connected by means of a transversely-extending hinge and cut away above the hinge to permit the last to be contracted longitudinally by an upward movement of the heel part with respect to the fore part. The hinge member on the fore part is shown as consisting of a hollow metallic sleeve 5 set into and held fast in a recess cut in the fore part of the last, behind which it extends downward to the bottom of the last as at 6. Above the extension 6 a gap 7 extends from end to end of the sleeve, which is otherwise cylindrical internally. The co-operating hinge member on the heel part consists of two substantially cylindrical projections 8—8 carried by the front ends of the heel sections $a'$—$a'$, one on each, and extending transversely in line with each other, so that they can be inserted endwise into or withdrawn from the sleeve 5 by a lateral movement of the heel part with respect to the fore part and can turn circumferentially within the sleeve to a limited extent provided for by the gap 7. Said gap is less than half the circumference of the sleeve 5, so that the hinge members can be separated only by a relative lateral movement of the fore part and the heel part. Consequently these parts remain connected after the last has been contracted longitudinally, and this constitutes an advantage over the arrangement shown in Figs. 1 and 2 for the reason that it enables the heel part to be used as a means for withdrawing the fore part from a shoe after the last has been contracted.

According to the arrangement shown in Figs. 6 to 11 inclusive the sections $a'$—$a'$ of the heel part are hinged together in the manner already described and are expanded by means of two pins 9—9 carried by the hinge projections 8—8 respectively and extending forward therefrom into a pair of corresponding slots 10—10 cut in the sleeve 5. The lower ends of these slots connect with another slot 11 which extends transversely through one end of the sleeve 5 and is so located that when the heel part of the last is swung upward on the hinge the projecting ends of the pins 9—9 enter said slot 11 and can therefore slide along it when the heel part and the fore part of the last are connected or disconnected. After these parts have been connected and brought into proper lateral alinement with each other the pins 9—9 are in position to enter the lower ends of the slots 10—10 respectively, which slant upward and outward and therefore act to force the pins 9—9 apart and expand the heel part of the last when the latter is swung downward. The angle of slant of the slots 10—10 will depend upon the size and width of the particular fore part in which they are employed, being such in each case as to cause the heel part to be expanded to a width corresponding to that of the fore part to which it is connected.

The form of last shown in Figs. 12 to 16 inclusive is similar to that just described except that a different arrangement is employed for expanding the heel part. In this case the expanding pins and slots above described are omitted and the heel part is expanded by means of the narrow webs 12—12 which connect the projections 8′—8′ with the heel sections $a^2$—$a^2$ respectively and are received within notches 13—13 formed in the upper edge of the sleeve 5′ at its rear. These notches are so shaped as to provide oppositely-slanting faces 14—14 which engage the corresponding edges of the webs 12—12 and force the latter and the corresponding heel sections apart when swung downward. The extent to which the heel part is expanded will evidently depend upon the distance between the notches 13—13, which will vary according to the width of the fore part in which they are formed. When the heel part is swung upward the webs 12—12 rise above the notches 13—13 and enter the gap 7', thus enabling the fore part and the heel part to be disconnected by a relative transverse movement during which the webs move laterally in said gap.

In the forms of last already described the lateral expansion or contraction of the heel part takes place automatically when the last is expanded or contracted longitudinally, which we regard as desirable. This is not essential, however, since the heel part may be expanded laterally by means of a device adapted to be manually operated after the last has been expanded longitudinally. For example, in Figs. 17 to 21 inclusive is shown a last in which the heel part is expanded by means of a small rod 15 held by a staple 16 in a groove 17 which extends upward and downward in the rear end of the fore part. The rod 15 carries at its upper end an outwardly-projecting pin 18, which prevents it from passing out from under the staple when the fore part is detached, and at its lower end it is tapered laterally to provide a wedge 19 adapted to enter between the front ends of the heel sections $a^3$—$a^3$ and wedge them apart when the rod is forced downward by hand, the wedge 19 being so proportioned, according to the width of the fore part which carries it, as to expand the heel part to the corresponding width. The heel part and fore part are shown as connected by a transverse hinge hereinafter described.

Figs. 22 to 26 inclusive show a form of last in which the heel part includes two outer sections $a^4$—$a^4$ and an intermediate section $a^5$ arranged side by side, of which the two outer sections are movable laterally toward and away from the intermediate section to contract and expand the heel part and are located between top and bottom plates 20 and 21 formed on or carried by the intermediate section. This construction has the advantages that the socket $f$ for the jack spindle can be formed wholly in one section, (the intermediate section,) and that the bottom plate 21 prevents the exposure of gaps on the bottom face of the heel part when expanded. The pivotal connection between the heel part sections near their rear upper corners is shown as provided by slanting projections 22—22 formed respectively on the inner faces of the outer sections $a^4$—$a^4$ and fitting loosely within corresponding recesses 23—23 cut in the intermediate section $a^5$, whereby, in connection with the spring $d$, the outer sections are held in place and their lateral movements are sufficiently provided for. The bottom plate 21 is given the proper peripheral outline for the heel part when fully contracted, and is upwardly beveled at its side and rear edges, so that the irregularities of surface resulting from the expansion of the heel part are so slight that they are of no practical importance at the particular locations where they occur.

The hinge connection between the heel part and the fore part is shown in this case as provided by transversely alined hook-shaped projections 25 formed on the heel part sections, one on each, and so shaped that they can be inserted laterally into or withdrawn from a recess 26 formed in the fore part, where they are retained during the pivotal movements of the fore and heel parts by a metal plate 27, secured to the fore part and overlying the free ends of the projections 25. The expansion of the heel part is accomplished by means of a rearwardly-tapering projection 28 forming the bottom of the recess 26 and adapted to enter between wings 29 on the outer heel sections $a^4$—$a^4$, which wings are laterally beveled in correspondence with the taper of the projection 28 and are spread apart by said projection and thus caused to expand the heel part when the latter is swung downward on the transverse hinge. The extent of lateral expansion of the heel part will of course depend on the width of the projection 28, which will vary in correspondence with the widths of the different fore parts.

In Figs. 27 to 32 inclusive is shown another form of heel part having two outer sections $a^6$—$a^6$ and an intermediate section $a^7$, which are connected to the fore part and expanded in the same way as in the form of last last described. In this case, however, the formation of undesirably wide gaps in the bottom of the heel part when expanded is prevented by extending the lower portions of the outer sections $a^6$—$a^6$ laterally toward each other beneath the intermediate section $a^7$ and providing them with fingers 30 which are interleaved as shown in Figs. 29 and 30, so that the total space left between the outer sections when expanded is divided into a number of small separate areas. When this construction is employed the heel part sections need not be connected to one another by any hinge other than that provided by the interleaved fingers 30 and the spring $d$, since said fingers may be curved with respect to a common axis and slanted from top to bottom, as shown in Figs. 27 and 30, in such manner that the guiding action of the fingers will cause the heel part sections to move laterally with respect to a predetermined axis as a center, which center will preferably be located near the rear upper corner of the heel part for the reason previously explained.

The distribution of the gaps in the bottom of the heel part may be accomplished in another way in the manner illustrated in Figs. 33 to 39 inclusive, in which is shown a last having its heel part composed of two main sections $a^8$—$a^8$ hinged together near their rear upper corners as shown in Figs. 6, 12 and 17, and also detachably hinged to the fore part as shown in Figs. 27 and 28. Said sections $a^8$—$a^8$ are expanded by means of a rearwardly-tapering projection 31 formed on the rear end of the fore part about midway between its sides and adapted to enter between the beveled front ends of the heel part sections and force them apart when swung downward. In this case the sections $a^8$—$a^8$ are so formed as to provide a longitudinal recess extended upward from the bottom of the heel part and containing a number of vertical plates 32, which are loosely mounted on transversely-extending pins 33 and 34 and have their front ends shaped to enter laterally-spaced grooves 35 formed in the projection 31. Springs 36 tend to force the plates 32 together, as shown in Fig. 36, but when the heel part is swung downward, said plates are spaced laterally from one another and from the sections $a^8$—$a^8$ by the grooves 35, as shown in Fig. 35.

In Figs. 40 to 44 inclusive is shown another modification similar to that just described, except that the heel part comprises three main sections, of which the middle section $a^9$ carries a top plate 37 overlying the outer sections $a^{10}$—$a^{10}$ and contains the spindle socket $f$, and the supplementary gap-distributing plates 38 are located between the outer and middle sections and mounted on a transversely-extending pin 39 carried by the middle section $a^9$. The transverse hinge connection between the fore part and the heel part is similar to that illustrated in Fig. 22, except that the hook-shaped members 25 turn in a sleeve 5″ carried by the fore part and provided at its upper edge with a downwardly-extending integral lip 27′ which takes the place of the retaining plate 27 shown in Fig. 22. The expansion of the heel part is effected in this case by providing the outer sections $a^{10}$—$a^{10}$ with forwardly-extending tapered portions 40 adapted to enter corresponding recesses 41 in the rear end of the fore part, and the middle section $a^9$ and the plates 38 also have tapered front ends adapted to enter recesses 42 and 43 in the fore part, whereby they are spaced laterally from one another and from the outer sections when the heel part is swung downward. It will be understood, of course, that in this form of our last, as in all the others, the expanding means carried by each fore part will be so proportioned as to cause the heel part when fully expanded to have a width equal to that of such fore part at their adjacent ends.

In connection with the various forms of our last above described we have illustrated in the drawings a number of locking devices whereby the fore part and the heel part are held in expanded position while in use. Thus in Fig. 1 is shown a locking device consisting of a pin 44 passing through one of the heel part sections near its upper front corner and into the rear end of the fore part, whereby relative sliding movement of said parts is prevented. The pin is inserted manually after the last has been expanded and is withdrawn when it is desired to contract the last.

The locking device shown in Figs. 6 to 11 inclusive consists of a pivotally-mounted lever 45 located in a recess formed in one of the heel part sections $a'$ and having its forwardly-projecting front end provided with a notch 46 adapted to receive the rear upper edge of the sleeve 5 when the parts are fully expanded, thereby preventing the fore part and the heel part from swinging on the hinge which connects them. The lever 45 is automatically moved into locking position by a spring 47 but can be readily unlocked by pressing downward on its front end, which is exposed at the bottom of the gap separating the fore part and heel part.

In the form of last shown in Figs. 17 to 21 inclusive the fore part and the heel part are locked in expanded position by means included in the hinge construction whereby said parts are connected. In this case the hinge member carried by the fore part consists of a metallic sleeve 5‴ provided at its upper edge with a downwardly-extending lip 27″, as in Fig. 40, and adapted to receive the hook-shaped members 25′—25′ on the sections $a^3$. Each of the members 25′ is provided with a downwardly-projecting pin 48 adapted to enter a slot 49 formed in the sleeve 5‴ and composed of a circumferentially-extending portion and a laterally-extending portion, the arrangement of which is such that when the heel part is laterally contracted the pins 48 are located in position to move in the circumferential portions of the corresponding slots and the heel part can be swung upward or downward. When the heel part is swung downward and expanded by the wedge 19, however, the pins 48 enter the laterally-extending portions of the slots 49 and acts as stops to prevent the heel part from being swung upward so long as it remains laterally expanded. After the last has been contracted the heel part can be lifted upward sufficiently to withdraw the pins 48 from the slots 49, as shown in Fig. 20, whereupon the hook-shaped members 25′—25′ can be slid laterally out of the sleeve 5‴ to disconnect the fore part and the heel part, their disconnection by a direct rearward movement of the heel part being prevented by the lip 27″.

The locking device shown in Figs. 22 to 26 inclusive consists of a pivotally-mounted lever 50 located in a recess formed in the intermediate heel part section $a^5$, and provided at its forwardly-projecting front end with a downwardly-extending hook 51 adapted to enter a perforation 52 in a plate 53 secured to the rear end of the fore part, the hook 51 being caused to engage the edge of said plate by a spring 54. The rear end of the lever 50 is located beneath the bottom of the spindle socket $f$ and is accessible through a perforation 55, so that the parts may be unlocked by inserting a small rod or the like into the socket $f$ and perforation 55 and pressing it against the rear end of the lever 50. This form of locking device is particularly desirable because it enables the last to be unlocked by placing it on a special jack spindle having an unlocking pin adapted to pass automatically through the perforation 55.

The locking device shown in Fig. 27 consists of a small bar 56 arranged to slide longitudinally in the front end of the intermediate heel part section $a^7$ and adapted to be moved upward against the pressure of a spring 57 by means of a forwardly-projecting pin 58 movable in a slot 59. The lower end of the bar 56, when in its lowermost position, is received in a vertical slot 60 in the rear end of the fore part and lies in front of a transversely-extending plate 61 carried by the fore part on its bottom face, and it will be evident that when said bar and plate are engaged, as shown in Fig. 27, the fore part and the heel part cannot turn on the hinge which connects them because the plate 61 is located in the path of movement of the lower end of the bar 56.

Figs. 40 to 44 inclusive show another form of locking device of such construction that the parts of the last can be automatically unlocked by placing the last on a jack spindle. In this case the connection between the heel part and the fore part consists of a rod 62 held between the middle heel part section $a^9$ and one of the sections $a^{10}$ and having laterally-bent ends, of which the front end is adapted to enter a staple 63 carried by the fore part when the heel part is applied thereto. The rear end of said rod 62 is located in a groove 64 formed in the heel part section $a^9$ and so shaped that when the heel part is swung upward the rear end of the rod moves downward in the groove. A pivoted lever 65 is normally held by a spring 66 in such position that when the heel part is swung downward the rear end of the rod 62 slides upward along said lever and turns it on its pivot until the end of the rod passes above the upper end of the lever, whereupon the latter is thrown forward beneath the rod and prevents it from moving downward in the groove 64, and said rod then serves as a fixed strut to lock the heel part and the fore part in their extended position. The rear end of the lever 65 extends into the bottom of the spindle socket $f$, so that when the last is placed on the spindle the latter, if long enough, will turn the lever on its pivot and thereby release the rod 62, leaving the latter free to move downward along the groove 64. The last can then be collapsed longitudinally, the front end of the rod 62 being withdrawn from the staple 63 when the heel part is detached from the fore part.

It will be observed that in each form of last above described the heel part cannot be detached from the fore part until after the last has been contracted longitudinally, so that a single locking device serves to keep the parts connected as well as to prevent longitudinal contraction. Various locking devices other than those specifically shown and described may be employed in connection with a last of our general construction, and the locking devices shown are not limited to the specific forms of last in connection with which they are illustrated, since for the most part they can be readily adapted for use in connection with one or more of the other forms. For example, any of the locking devices shown in Figs. 6, 22, 27 and 40 may be employed without substantial modification in one or both of the forms of last shown in Figs. 12 to 16 inclusive and Figs. 33 to 39 inclusive, in which no locking devices are shown.

It is an advantage inherent in our last that its withdrawal from a shoe formed on it is greatly facilitated by the lateral contraction of its heel part which precedes or accompanies the longitudinal contraction of the last and thus prevents the heel part from binding in the rear portion of the shoe. In like manner the subsequent introduction of the last into the shoe, if this becomes necessary, is facilitated by the fact that the heel part is laterally collapsed when it enters the top of the shoe and is not expanded to its full width until it reaches the bottom of the shoe. It will be obvious that the employment of a spring or other means for laterally contracting the heel part of the last is not at all essential, since such contraction may be readily produced by external pressure such as is exerted when the heel part is withdrawn from the shoe.

We claim:

1. A longitudinally expansible and contractible last comprising a fore part and a laterally expansible and contractible heel part having means for readily connecting and disconnecting them, and means for laterally expanding the heel part to a width corresponding to that of the fore part.

2. A longitudinally expansible and contractible last comprising a fore part and a laterally expansible and contractible heel part having means for readily connecting and disconnecting them, and means operated by the longitudinal expansion of the last for laterally expanding the heel part to a width corresponding to that of the fore part.

3. A longitudinally expansible and contractible last comprising a fore part and a laterally expansible and contractible heel part having means for readily connecting and disconnecting them when in their longitudinally contracted position only, and means for laterally expanding the heel part to a width corresponding to that of the fore part.

4. A longitudinally expansible and contractible last comprising a fore part and a laterally expansible and contractible heel part having means for readily connecting and disconnecting them when in their longitudinally contracted position only, means operated by the longitudinal expansion of the last for laterally expanding the heel part to a width corresponding to that of the fore part, and means for locking the parts in their longitudinally expanded position.

5. A last comprising a fore part and a laterally expansible and contractible heel part having means for readily connecting and disconnecting them, said heel part being provided with a spindle-receiving socket, means for laterally expanding the heel part to a width corresponding to that of the fore part, and a locking device carried by the heel part in position to be engaged and unlocked by the insertion of a spindle into said socket.

6. A last comprising a fore part and a laterally expansible and contractible heel part having means for readily connecting and disconnecting them and including a transversely-extending hinge and means for laterally expanding the heel part to a width corresponding to that of the fore part.

7. A last comprising a fore part and a laterally expansible and contractible heel part having means for readily connecting and disconnecting them and including a transversely-extending hinge, and means operated by relative movement of the parts on said hinge for laterally expanding the heel part to a width corresponding to that of the fore part.

8. A last comprising a fore part and a laterally expansible and contractible heel part provided with transversely-extending hinge members adapted to be readily connected and disconnected by a relative lateral movement, and means for laterally expanding the heel part to a width corresponding to that of the fore part.

9. A last comprising a fore part and a laterally expansible and contractible heel part provided with transversely-extending hinge members adapted to be readily connected and disconnected by a relative lateral movement when the last is in its longitudinally contracted position only, means operated by the longitudinal expansion of the last for laterally expanding the heel part to a width corresponding to that of the fore part, and means for locking said parts in their longitudinally expanded position.

10. A last comprising a fore part and a heel part having means for readily connecting and disconnecting them, said heel part being longitudinally divided into sections connected for relative lateral movement with respect to a diagonal axis located adjacent to its rear upper corner, and means for laterally expanding the heel part to a width corresponding to that of the fore part.

11. A last comprising a fore part and a heel part having means for readily connecting and disconnecting them and including a transversely-extending hinge, said heel part being longitudinally divided into sections connected for relative lateral movement with respect to a diagonal axis located adjacent to its rear upper corner, and means for laterally expanding the heel part to a width corresponding to that of the fore part.

12. A last comprising a fore part and a heel part having means for readily connecting and disconnecting them, said heel part being longitudinally divided into sections hinged together on a diagonal axis located adjacent to its rear upper corner, and means for laterally expanding the heel part to a width corresponding to that of the fore part.

13. A last comprising a fore part and a heel part provided with transversely-extending hinge members adapted to be readily connected and disconnected by a relative lateral movement, the heel part being longitudinally divided into sections hinged together on a diagonal axis located adjacent to its rear upper corner, and means operated by a relative movement of the heel part and fore part on their transversely-extending hinge members for laterally expanding the heel part to a width corresponding to that of the fore part.

14. In a last a laterally expansible and contractible heel part having means for readily connecting it to and disconnecting it from any one of a plurality of fore parts of different widths, said heel part being provided with means adapted to coöperate with the fore part to which it is connected for laterally expanding it to a width corresponding to that of said fore part.

15. In a last, a laterally expansible and contractible heel part provided with a transversely-extending hinge member arranged and constructed to be readily connected to and disconnected from a complemental hinge member on any one of a plurality of corresponding fore parts of different widths, and means carried by said heel part and adapted to coöperate with the fore part to which it is connected for laterally expanding it to a width corresponding to that of said fore part.

16. In a last, a longitudinaly-divided heel part comprising sections connected for relative lateral movement with respect to a diagonal axis located adjacent to its rear upper corner and provided with means for readily connecting it to and disconnecting it from any one of a plurality of fore parts of different widths.

17. In a last, a longitudinally-divided heel part comprising sections connected for relative lateral movement with respect to a diagonal axis located adjacent to its rear upper corner and provided with a transversely-extending hinge member arranged and constructed to be readily connected to and disconnected from a complemental hinge member on any one of a plurality of fore parts of different widths.

18. In a last, a longitudinally-divided heel part comprising sections hinged together on a diagonal axis located adjacent to its rear upper corner and provided with means for readily connecting it to and disconnecting it from any one of a plurality of fore parts of different widths.

19. In a last, a readily-detachable heel part divided longitudinally into sections connected for relative lateral movement with respect to an axis located at its rear upper corner, whereby said heel part is rendered laterally expansible and contractible, and means for distributing the gap resulting from the lateral expansion of the heel part at the bottom of the latter.

20. In a last, a readily-detachable heel part divided longitudinally into sections capable of relative lateral movement, whereby said heel part is rendered laterally expansible and contractible, and means for distributing the gap resulting from the lateral expansion of the heel part at the bottom of the latter.

21. A longitudinally expansible and contractible last comprising a fore part and a laterally expansible and contractible heel part having means for readily connecting and disconnecting them, means for laterally expanding the heel part to a width corresponding to that of the fore part, and means for distributing the gap resulting from the lateral expansion of the heel part at the bottom of the latter.

22. In a last, a readily-detachable heel part divided longitudinally into sections capable of relative lateral movement, whereby said heel part is rendered laterally expansible and contractible, the lower portion of said heel part being provided with supplementary longitudinally-extending sections adapted to separate laterally when the heel part is expanded and thereby distribute the resulting gap at the bottom of the latter.

23. A longitudinally expansible and contractible last comprising a fore part and a laterally expansible and contractible heel part having means for readily connecting and disconnecting them, the lower portion of said heel part being provided with supplementary longitudinally-extending sections capable of relative lateral movement, means for laterally expanding the heel part to a width corresponding to that of the fore part, and means for laterally separating the supplementary sections to distribute the gap resulting from the lateral expansion of the heel part at the bottom of the latter.

Signed at Boston, Massachusetts, this 29th day of November, 1916.

JEREMIAH F. COLLINS.
LOUIS B. WESTON.